(12) United States Patent
Kobayashi et al.

(10) Patent No.: US 9,444,120 B2
(45) Date of Patent: Sep. 13, 2016

(54) RECHARGEABLE LITHIUM BATTERY AND METHOD FOR MANUFACTURING THE SAME

(75) Inventors: Naoya Kobayashi, Yokohama (JP); Wan-Uk Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 632 days.

(21) Appl. No.: 11/614,350

(22) Filed: Dec. 21, 2006

(65) Prior Publication Data
US 2007/0148549 A1    Jun. 28, 2007

(30) Foreign Application Priority Data

Dec. 21, 2005  (JP) .................................. 2005-367485
Dec. 21, 2006  (KR) ........................ 10-2006-0131841

(51) Int. Cl.
| | |
|---|---|
| *H01M 4/131* | (2010.01) |
| *H01M 4/1315* | (2010.01) |
| *H01M 4/505* | (2010.01) |
| *H01M 4/485* | (2010.01) |
| *H01M 4/525* | (2010.01) |

(Continued)

(52) U.S. Cl.
CPC ......... *H01M 10/0525* (2013.01); *H01M 4/131* (2013.01); *H01M 4/1315* (2013.01); *H01M 4/485* (2013.01); *H01M 4/505* (2013.01); *H01M 4/525* (2013.01); *H01M 4/5825* (2013.01); *H01M 2004/027* (2013.01); *Y02E 60/122* (2013.01); *Y02P 70/54* (2015.11); *Y10T 29/49108* (2015.01)

(58) Field of Classification Search
CPC .. H01M 4/131; H01M 4/1315; H01M 4/505; H01M 4/525; H01M 4/5825; H01M 2004/027

USPC .......... 429/231.95, 231.1, 220, 231.5, 231.8, 429/219; 29/623.1
See application file for complete search history.

(56) References Cited

U.S. PATENT DOCUMENTS 5,576,121 A * 11/1996 Yamada et al. ................ 429/220
7,906,234 B2 * 3/2011 Tamai et al. ................... 429/162

(Continued)

FOREIGN PATENT DOCUMENTS

| | | | |
|---|---|---|---|
| JP | 08-007886 | 1/1996 | |
| JP | 08-124559 | * 5/1996 | ............. H01M 4/02 |

(Continued)

OTHER PUBLICATIONS

Japanese Office Action dated Aug. 23, 2011 for JP Application No. 2005-367485, which corresponds to U.S. Appl. No. 11/614,350.

*Primary Examiner* — Barbara Gilliam
*Assistant Examiner* — Angela Martin
(74) *Attorney, Agent, or Firm* — H.C. Park & Associates, PLC (57) ABSTRACT

A rechargeable lithium battery according to the present invention includes a positive electrode including a positive active material being capable of intercalating and deintercalating lithium; a negative electrode including a negative active material being capable of intercalating and deintercalating lithium; and a non-aqueous electrolyte. The negative electrode includes a lithium-containing metal compound that is inactive for water, and can intercalate lithium during at least discharge. The rechargeable lithium battery has an irreversible capacity during a first charge and discharge, and has no problems such dendrite, electrolyte decomposition, or dissolution of a negative current collector.

14 Claims, 3 Drawing Sheets

(51) Int. Cl.
  *H01M 10/0525* (2010.01)
  *H01M 4/58* (2010.01)
  *H01M 4/02* (2006.01)

(56) References Cited

U.S. PATENT DOCUMENTS

| | | | | |
|---|---|---|---|---|
| 2001/0021472 | A1* | 9/2001 | Barker | C01B 25/45 |
| | | | | 429/231.95 |
| 2001/0046626 | A1* | 11/2001 | Kida | H01M 4/661 |
| | | | | 429/188 |
| 2004/0086784 | A1* | 5/2004 | Barker et al. | 429/231.5 |
| 2007/0009801 | A1* | 1/2007 | Inagaki et al. | 429/231.95 |
| 2007/0048612 | A1* | 3/2007 | Nakajima et al. | 429/231.95 |
| 2007/0259259 | A1* | 11/2007 | Martinent et al. | 429/122 |
| 2007/0259271 | A1 | 11/2007 | Nanno et al. | |
| 2013/0029223 | A1 | 1/2013 | Armand et al. | |

FOREIGN PATENT DOCUMENTS

| | | | | |
|---|---|---|---|---|
| JP | 10-312789 | * | 11/1996 | H01M 4/02 |
| JP | 10-312789 | | 11/1998 | |
| JP | 200048810 | * | 2/2000 | H01M 4/02 |
| JP | 2000509193 | | 7/2000 | |
| JP | 2001500665 | | 1/2001 | |
| JP | 2001-216962 | | 8/2001 | |
| JP | 2002-117836 | | 4/2002 | |
| JP | 2005158719 | * | 6/2005 | H01M 10/40 |
| JP | 2007005279 | | 1/2007 | |
| JP | 2007080812 | | 3/2007 | |
| JP | 2007123094 | * | 5/2007 | H01M 4/58 |
| KR | 1020020079346 | | 10/2002 | |
| KR | 1020040096203 | | 11/2004 | |
| KR | 10-0529103 | * | 11/2005 | C22C 28/00 |
| KR | 100529103 | | 11/2005 | |
| KR | 1020060028121 | | 3/2006 | |
| KR | 1020060095221 | | 8/2006 | |

* cited by examiner

RECHARGEABLE LITHIUM BATTERY AND METHOD FOR MANUFACTURING THE SAME

CROSS-REFERENCE TO RELATED APPLICATION

This application claims priority to and the benefit of Japanese Application No. 2005-367485 filed with the Japanese Patent Office on Dec. 21, 2005, and Korean Patent Application No. 10-2006-0131841 filed in the Korean Intellectual Property Office on Dec. 21, 2006, the entire contents of which are incorporated herein by reference.

BACKGROUND OF THE INVENTION (a) Field of the Invention

The present invention relates to a rechargeable lithium battery and a method of manufacturing the same. More particularly, the present invention relates to a rechargeable lithium battery that has an irreversible capacity during a first charge and discharge, and has no problems such as dendrites, electrolyte decomposition, or dissolution of a negative current collector.

(b) Description of the Related Art

In general, a material that is reversibly capable of intercalating and deintercalating lithium ions has been used for an active material for a rechargeable lithium battery. For a positive active material of a rechargeable lithium battery, lithium cobalt oxide ($LiCoO_2$), lithium nickel oxide ($LiNiO_2$), lithium manganese oxide ($LiMn_2O_4$), and so on has been used. For a negative active material of a rechargeable lithium battery, a carbon material has been used. Examples of the carbon material are graphite, amorphous carbon, or low-crystalline carbon.

Lithiums included in a positive active material are transferred between a positive electrode and a negative electrode in the form of lithium ions during charge and discharge and reversibly intercalated into or deintercalated from a positive active material or a negative active material.

Carbon material such as graphite, amorphous carbon, or low-crystalline carbon has a large charge and discharge capacity, but also has an irreversible capacity. The irreversible capacity refers to a capacity incurred by lithium ions that are not deintercalated from the carbon material at a second or subsequent discharge after they are intercalated into the carbon material at a first charge, and thus do not participate in a cell reaction. Particularly, an irreversible capacity of the carbon material at first charge is up to 5% to 10% of the total charge and discharge capacity of the battery.

However, when a part of lithium supplied from a positive active material to a negative active material at an initial charge can not be restored during the subsequent discharge, the amount of lithium ions become smaller and thereby contribute less to the charges and discharges after the first one, failing in acquiring a rechargeable lithium battery with high-capacity. Here, even though a carbon material with big charge and discharge capacity is used, the result can be the same when irreversible capacity is too big. In addition, the irreversible capacity can be generated by a Si-based material, a Sn-based material, or an Al-based material, as well as the carbon material.

However, since the carbon material has extremely smaller irreversible capacity from the second charge and discharge reaction, there is no more worry about sharp decrease of the amount of lithium ions contributing to the charge and discharge reaction. Accordingly, in order to accomplish high-capacity of a rechargeable lithium battery, there have been suggestions such as reforming a carbon material, decreasing irreversible capacity itself at the initial charge, or charging the amount of lithium corresponding to the irreversible capacity inside a battery before the charge.

In particular, the last one has been paid more attention to, in which the same amount of metal lithium as irreversible capacity is included in a negative electrode before the reaction, so that it can be used as an active material at the first discharge and compensate the lithium corresponding to irreversible capacity.

In addition, there is another suggestion that a rechargeable lithium battery is fabricated by charging a negative electrode with lithium-containing composite nitride instead of metal lithium with a carbon material (Japanese Patent laid-open No. 2002-117836).

However, in a rechargeable lithium battery including a negative electrode pre-charged with metal lithium, since it is hard to predict the exact amount of metal lithium corresponding to irreversible capacity, it has been designed to include a little more amount of metal lithium than the exact amount corresponding to irreversible capacity. Accordingly, a rechargeable lithium battery designed like the above could include a negative electrode containing the residue of metal lithium after the initial discharge.

Lithium ions can be deposited from the surface of the metal lithium at the next charge. In addition, lithium ions are generally deposited as a dendrite shape, which can penetrate a separator, and thereby generate a short-circuit between the negative and positive electrodes.

Furthermore, the lithium-containing composite nitride disclosed in Japanese Patent laid-open No. 2002-117836 can be decomposed while reacting with water. Accordingly, when a negative electrode including the lithium-containing composite nitride is fabricated, its atmosphere should be dry, which results in increasing manufacturing cost.

On the other hand, FIG. 2 of Japanese Patent laid-open No. 2002-117836 disclosed a charge and discharge curved line of a rechargeable lithium battery including $LiCoO_2$ as a positive electrode and a carbon material and lithium-containing composite nitride as a negative electrode. A shown in FIG. 2, the lithium-containing composite nitride had discharge reaction at a voltage range of 2.5 to 3V. However, the charge and discharge curved line was gained by only regulating a charge and discharge current and a cut-off voltage at the charge and discharge but did not reflect a method of regulating the amount of discharge against the amount of initial charge. Accordingly, the rechargeable lithium battery is over-charged with lithium-containing composite nitride compared with irreversible capacity at the first charge and discharge, and thereby, over-discharged fro such a long time, which leads to decomposition of an electrolyte solution and dissolution of a negative current collector.

SUMMARY OF THE INVENTION

One embodiment of the present invention provides a rechargeable lithium battery that has an irreversible capacity during a first charge and discharge, and has no problems such as dendrites, electrolyte decomposition, or dissolution of a negative current collector.

Another embodiment of the present invention provides a method of manufacturing the rechargeable lithium battery.

According to an embodiment of the present invention, provided is a rechargeable lithium battery that includes a positive electrode including a positive active material being capable of intercalating and deintercalating lithium; a negative electrode including a negative active material being capable of intercalating and deintercalating lithium; and a non-aqueous electrolyte. The negative electrode includes a lithium-containing metal compound that is inactive for water, and can intercalate lithium during at least discharge.

The lithium-containing metal compound has a potential of 1.0 to 4.0V relative to a metal lithium counter electrode during intercalation and deintercalation of lithium.

The lithium-containing metal compound includes Li; and at least one element selected from the group consisting of S, P, O, Cl, Se, F, Br, I and combinations thereof.

The lithium-containing metal compound may further include an element selected from the group consisting of Ni, Co, Cu, Zn, Ga, Ge, Si, Al, Fe, V, Mn, Ti, Mo, Cr, Nb, Pt, and combinations thereof.

The lithium-containing metal compound may be an olivine-based lithium-containing metal compound.

The lithium-containing metal compound is $Li_3T_2(PO_4)_3$ wherein T is an element selected from the group consisting of Fe, V, and combinations thereof.

The lithium-containing metal compound may be $Li_2CuO_2$.

The negative active material may be a material selected from the group consisting of C; Si; Sn; Al; a Si alloy; a Sn alloy; a Al alloy; a metallic compound including an element selected from the group consisting of C, Si, Sn, Al, and combinations thereof, and combinations thereof.

According to an embodiment of the present invention, provided is a method of manufacturing a rechargeable lithium battery that includes providing a positive electrode including a positive active material, a negative electrode including a negative active material and a lithium-containing metal compound that is inactive for water and can intercalate lithium during at least discharge, and a non-aqueous electrolyte; providing the non-aqueous electrolyte between the positive and negative electrode to fabricate a rechargeable lithium battery; charging the batter to a charge cut-off voltage; and discharging the battery until a discharge capacity is the same as a charge capacity.

The rechargeable lithium battery may be first-discharged until a potential of the negative electrode is 1.0 to 4.0V relative to a metal lithium counter electrode.

DETAILED DESCRIPTION OF THE INVENTION

The rechargeable lithium battery according to one embodiment includes a positive electrode, a negative electrode, and a non-aqueous electrolyte housed in a battery case such as a cylindrical, prismatic, coin-type, or sheet-shaped case. When the non-aqueous electrolyte is a non-aqueous electrolyte solution, a separator is interposed between the positive electrode and negative electrode. The separator may also be interposed between the positive electrode and negative electrode when the non-aqueous electrolyte is a solid electrolyte.

Hereinafter, the present invention will be described more fully hereinafter with reference to the accompanying drawings, in which exemplary embodiments of the invention are shown.

Figure 1:
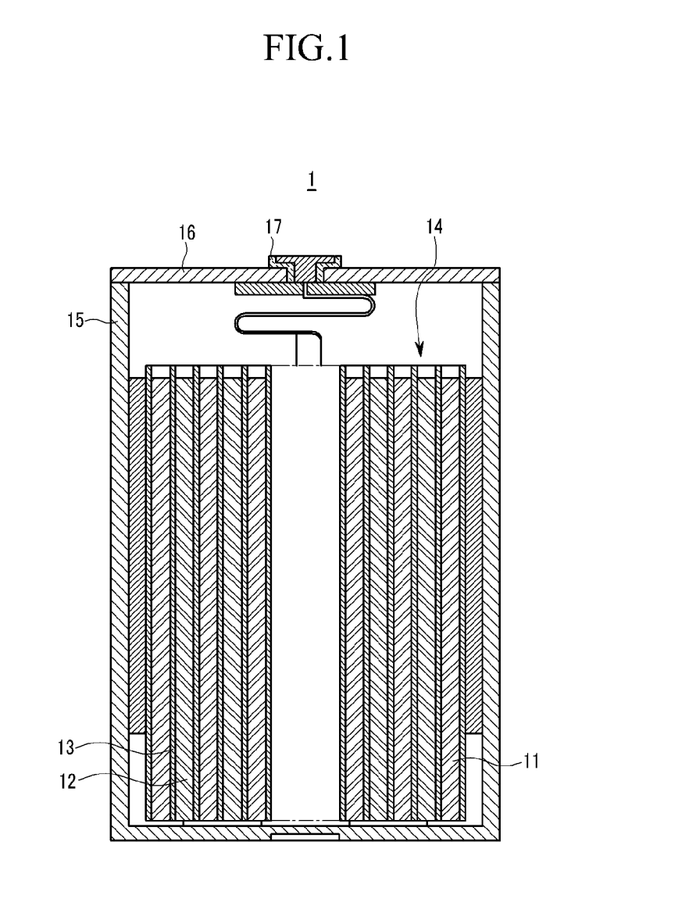
FIG. 1 is a schematic cross sectional perspective illustrating a rechargeable lithium battery according to one embodiment of the present invention.

FIG. 1 is a schematic cross sectional perspective illustrating a rechargeable lithium battery according to one embodiment of the present invention.

Referring to FIG. 1, the rechargeable lithium battery 1 according to one embodiment, the rechargeable lithium battery 1 is fabricated by placing the electrode assembly 14 including the positive electrode 11, the negative electrode 12, and the separator 13 interposed between the positive electrode 11 and the negative electrode 12 inside the case 15, then injecting an electrolyte through the upper of the case 15, and sealing the case 15 by the cap plate 16 and the gasket 17.

Positive Electrode

The positive electrode includes a positive active mass including a positive active material, a conductive agent, and a binder; and a positive current collector on which the positive active mass is disposed. The positive active mass may be formed in a disk-shape to fabricate a pellet-shaped or sheet-shaped electrode.

The positive active material may be a material that can reversibly intercalate and deintercalate lithium such as a Li-containing compound, oxide, sulfide, and so on. The positive active material may include at least one selected from the group consisting of Mn, Co, Ni, Fe, Al, and combinations thereof. Examples of the positive active material include $LiMn_2O_4$, $LiCoO_2$, $LiNiO_2$, $LiFeO_2$, $LiNi_{1/3}Co_{1/3}Mn_{1/3}O_2$, $LiNi_{0.8}Cu_{0.2}O_2$, and so on. The binder may include polyvinylidene fluoride, polytetrafluoro ethylene, and so on. The conductive agent may include carbon such as carbon black, ketjen black, graphite, and so on. The positive current collector may include a metal foil or a metal net formed of aluminum, stainless steel, and so on.

Negative Electrode

The negative electrode includes a negative active mass including a lithium-containing metal compound, a conductive agent, and a binder; and a negative current collector on which the negative active mass is disposed. The negative active mass may be formed in a disk-shape to fabricate a pellet-shaped or sheet-shaped electrode.

The negative active material may be a material being capable of intercalating and deintercalating lithium selected from the group consisting of C; Si; Sn; Al; a Si alloy; a Sn alloy; a Al alloy; a metallic compound including an element selected from the group consisting of C, Si, Sn, Al, and combinations thereof; and combinations thereof. Examples of the negative active material include a carbon material such as graphite, amorphous carbon, low-crystalline carbon, and so on, a Si powder, tin oxide, and so on.

The lithium-containing metal compound includes Li; and at least one element selected from the group consisting of S, P, O, Cl, Se, F, Br, I and combinations thereof. The lithium-containing metal compound may further include an element selected from the group consisting of Ni, Co, Cu, Zn, Ga, Ge, Si, Al, Fe, V, Mn, Ti, Mo, Cr, Nb, Pt, and combinations thereof.

The lithium-containing metal compound may be an olivine-based lithium-containing metal compound such as $Li_3T_2(PO_4)_3$ can intercalate and deintercalate lithiums after a second charge and discharge cycle.

Li$_2$CuO$_2$ may be also be used as the lithium-containing metal compound. The Li$_2$CuO$_2$ can deintercalate lithiums at the first discharge, but undergoes a crystal structure distortion resulting in incapability of intercalation and deintercalation of lithiums after the second cycle.

The lithium-containing metal compound can deintercalate lithiums during at least first discharge. 1 mole of the Li$_3$T$_2$(PO$_4$)$_3$ and Li$_2$CuO$_2$ compounds can deintercalate 1 mole of lithiums. The lithium-containing metal compound has a potential of a potential of 1.0 to 4.0V relative to a metal lithium counter electrode during intercalation and deintercalation of lithium. The potential range may be the same as a battery voltage ranging 0V to 1V when the LiMn$_2$O$_4$, LiCoO$_2$, or the like is used as a positive active material.

The lithium-containing metal compound is added to compensate an irreversible capacity. Therefore, it is advantageously added in the same amount as that corresponding to an irreversible capacity. However, since accurate irreversible capacity is difficult to calculate, it may be added in an amount corresponding to 5 to 15% of a theoretical capacity of the negative active material. When the negative active material is a carbon material, the lithium-containing metal compound is added in an amount of 5 mass % to 10 mass % based on the mass of the carbon material. When the negative active material is a Si powder, the lithium-containing metal compound is added in an amount of 7 mass % to 15 mass % based on the mass of the Si powder. When the negative active material is a multi-phase alloy powder that will be described hereinafter, the lithium-containing metal compound is added in an amount of 7 mass % to 15 mass % based on the mass of the multi-phase alloy powder.

The negative active material content included in a battery is determined depending on a theoretical capacity of a positive active material. More particularly, the negative active material content may be controlled so that a theoretical capacity of a negative active material is larger than that of a positive active material. The excessive theoretical capacity of the negative active material compared to the theoretical capacity of the positive active material corresponds to a reserving capacity of the lithium ion offered from the lithium-containing metal compound. Thereby, excessive lithium ions are prevented from depositing on a surface of the negative electrode after the second charge and discharge.

The binder for the negative electrode may be any organic or inorganic material that can be dispersed or dissolved in a solvent along with the negative active material and bind the negative active material after solvent removal. Further, the binder may be a material that can bind the negative active material by mixing the negative active material and then press-forming.

The binder may be selected from the group consisting of a vinyl-based resin, a cellulose-based resin, a phenol resin, a thermoplastic resin, a thermosetting resin, and so on. Specifically, the binder may be polyvinylidene fluoride, polyvinyl alcohol, carboxylmethyl cellulose, styrene butadiene rubber, and so on. The negative electrode may further includes a conductive agent such as carbon black, a graphite powder, a carbon fiber, a metal powder, a metal fiber, and so on, besides the negative active material and binder. The negative current collector may include a metal foil or a metal net formed of copper.

Figure 2A:
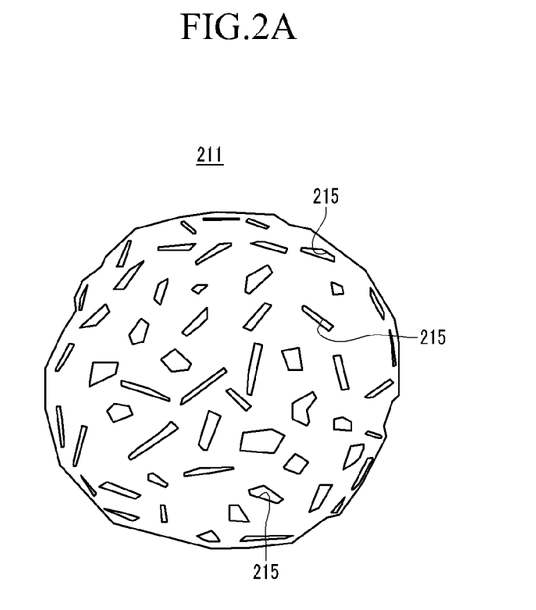
FIG. 2A is a schematic view of the negative active material of the rechargeable lithium battery according to one embodiment of the present invention.
Figure 2B:
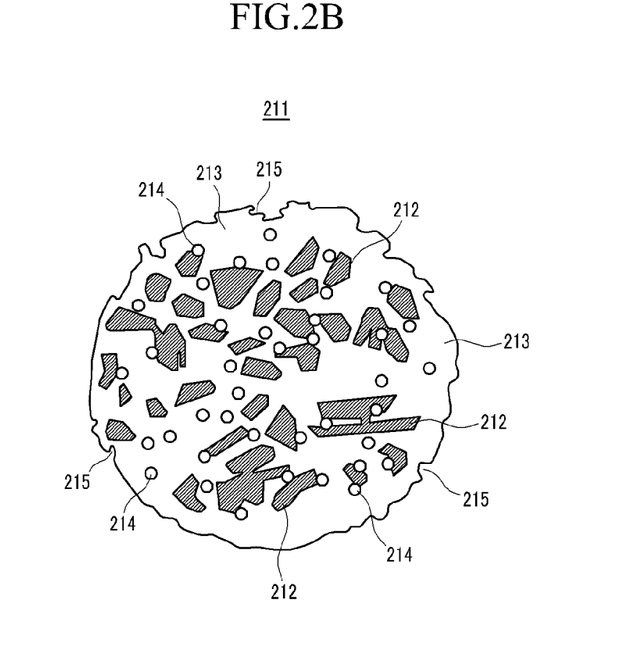
FIG. 2B is a schematic cross-sectional view of the negative active material of the rechargeable lithium battery according to one embodiment of the present invention.

The negative active material may be a multi-phase alloy powder. The multi-phase alloy powder includes Si-phase and SiM-phase, and also either one or both of X-phase or SiX-phase An amount of Si-phase on a surface of a multi-phase alloy powder particle may be less than that inside of the particle. FIG. 2A is a schematic view showing a particle that is composed of a multi-phase alloy powder, and FIG. 2B is a schematic cross-sectional view of the particle shown in FIG. 2A. As shown in FIGS. 2A and 2B, the multi-phase alloy powder particle 211 of the negative active material includes Si-phase 212, SiM-phase 213, and X-phase or SiX-phase 214.

Si-phase 212 is present in a larger amount inside of the particle than on the surface of the particle. The Si-phase 212 forms LiSi$_x$ phase by alloying lithium at charging and returns to Si-phase 212 by deintercalating the lithium at discharging. Since Si-phase 212 is present in a less amount on the particle surface than inside of the particle, decomposition reaction of the electrolyte by the Si-phase 212 on the particle surface can be prevented.

The SiM-phase 213 does not react with lithium during charge and discharge, and maintains the shape of the particle 211 to prevent expansion and contraction of the particle 211 itself. The element M of SiM-phase 213 is a metal element which is not alloyed with lithium, and is at least one element selected from the group consisting of Ni, Co, As, B, Cr, Cu, Fe, Mg, Mn, Y, and combinations thereof.

Particularly, the element M may be Ni, where SiM-phase 213 becomes Si$_2$Ni phase.

X-phase 214 imparts conductivity to a multi-phase alloy powder to reduce a specific resistance of the negative active material. The element X constituting X-phase 214 is a metal element having specific resistance of less than 3 Ω·m and is at least one selected from the group consisting of Ag, Cu, Au, and combination thereof.

Particularly, since Cu does not react with lithium to form an alloy, it can prevent expansion. Since Ag is not alloyed with Si, Ag is present in a single phase to improve conductivity of the particle by selecting a metal that is not alloyed with Ag as the element M.

Since Cu is alloyed with Si and has lower resistance than Si, it has both properties of element M and element X. In the above embodiment, Cu can be used as an element M or an element X, but Cu is not selected for both element M and element X simultaneously.

SiX-phase can be deposited as well as or instead of X-phase 214. SiX-phase imparts conductivity to a multi-phase alloy powder like X-phase 214 to reduce a specific resistance of the negative active material.

Crystalline properties of the Si-phase 212, SiM-phase 213, X-phase 214, and SiX-phase depend on a quenching rate, an alloy composition, and presence or absence of heat treatment after quenching. In the negative active material according to one embodiment, each phase may be a crystalline or amorphous phase, or a mixed phase of crystalline phase and amorphous phase. The negative active material may include another alloy phase along with Si-phase, SiM-phase, X-phase, and SiX-phase.

Si is an element forming a Si single phase and SiM-phase, and further SiX-phase, an alloy composition ratio is determined from an alloy phase diagram to form Si single phase, as well as SiM-phase and SiX-phase, and the capacity of Si can be obtained. When an amount of Si increases excessively, many Si-phases are deposited to increase expansion and contraction amount of the negative active material during charge and discharge, and the negative active material becomes a fine powder thereby deteriorating cycle characteristics. Specifically, the Si amount in the negative active material ranges from about 30 mass % to 70 mass %.

Since the element M is an element which can form SiM-phase with Si, its amount is determined so that the whole amount of M may alloy with Si. When the amount of M exceeds the amount capable of alloying with Si, the whole Si is alloyed decreasing capacity remarkably.

When the amount of M is less than the amount capable of alloying with Si, SiM-phase is reduced, expansion prevention of Si-phase is reduced, and cycle characteristics are deteriorated. M-phase may be present as a plurality of different elements, that is, M1-phase, M2-phase, and M3-phase. Since a solid-solution limit with Si is different depending on the kind of element, the composition ratio of M can not be specifically limited. The composition ratio should be determined so that Si-phase may remain after Si and M are alloyed to their solid-solution limit. Since the element M is not alloyed with lithium, it does not have a irreversible capacity. Since the element M is not alloyed with lithium, it does not have a non-reversible capacity.

When a composition ratio of X increases, specific resistance is reduced, but Si-phase is significantly reduced to deteriorate charge and discharge capacity. On the contrary, when a composition ratio of X decreases, specific resistance of the negative active material increases to deteriorate charge and discharge efficiency. The composition ratio of X may range 1 mass % to 30 mass % in the negative active material. The element X is preferably insoluble in an alkali solution.

An average particle diameter of the multi-phase alloy powder preferably ranges from 5 μm to 30 μm. Generally Si-included alloy powder has higher resistance than graphite powder that has been used as a negative electrode material of a rechargeable lithium battery, and therefore a conductive agent may be used. When the average particle diameter is less than 5 μm, an average particle diameter of the multi-phase alloy powder is less than the particle diameter of the conductive agent and thus an adding effect of the conductive agent is not sufficient, and therefore cell characteristics, such as capacity or cycle characteristics, are deteriorated. On the contrary, when the average particle diameter is more than 30 μm, filing density of the negative active material in the lithium secondary battery is deteriorated.

As shown in FIGS. 2A and 2B, a plurality of fine pores 215 is formed on a surface of a multi-phase alloy powder particle. The fine pores 215 are formed through impregnation with an alkali solution after quenching an alloy melt solution. It is a trace remained through an elution of Si-phase exposed on a surface of the particle immediately after quenching. Since the Si is not exposed on the surface of a particle, reaction with an electrolyte during charge is prevented and a specific surface area of a multi-phase alloy powder increases and so contact area with the electrolyte increases by formation of the fine pores 215 to improve charge and discharge efficiency.

The fine pores 215 have an average pore diameter ranging from about 10 nm to 5 μm The depth of the fine pores 215 may range from 10 nm to 1 μm. The multi-phase alloy powder has a specific surface area ranging from 0.2 $m^2/g$ to 5 $m^2/g$.

For example, the negative active material can be prepared as follows.

A method of preparing the negative active material includes obtaining quenched alloy powder which includes Si, element M, and element X, and impregnating the quenched alloy powder with an alkali solution. Hereinafter, each process step will be described.

First, the quenched alloy powder is obtained by quenching an alloy melt solution including Si, element M, and element X. The alloy melt solution is obtained by dissolving a single substance or an alloy simultaneously, for example, through high frequency induced heating method.

In the alloy melt solution, Si content ranges from about 30 mass % to 70 mass %. When Si content is excessively small in the alloy melt solution, Si-phase is not deposited. On the contrary, when Si content is excessively large, a negative active material that is not easily expanded and contracted is obtained.

The alloy melt solution can be quenched, for example, using gas atomization, water atomization, roll quenching, and so on. Through gas atomization and water atomization, powder-phase quenched alloy is obtained and through roll quenching, thin bar-shaped quenched alloy is obtained. The bar-shaped quenched alloy is further pulverized to obtain a powder. An average particle diameter of such obtained quenched alloy powder is the average particle diameter of the resultant multi-phase alloy powder. When obtaining the quenched alloy powder, its average particle diameter is preferably adjusted to range from about 5 μm to 30 μm.

The quenched alloy powder obtained from an alloy melt solution can be a quenched alloy including entirely amorphous phase, or a quenched alloy including partial amorphous phase and the rest being crystalline phase particles, or a quenched alloy including entirely crystalline phase. The quenched alloy powder essentially includes SiX-phase and SiM-phase, and also includes either one or both of X-phase and SiX-phase. Each Si-phase, SiM-phase, X-phase, and SiX-phase is present in a uniformly mixed state in an alloy structure.

A quenching rate ranges more than or equal to about 100K/second. When the quenching rate is less than 100K/second, there is a problem that each Si-phase, SiM-phase, X-phase, and SiX-phase is not deposited uniformly in an alloy structure, and crystalline size of each phase increases and it is difficult to obtain uniform expansion prevention and conductivity impartment.

Next, the quenched alloy is impregnated in alkali solution and Si-phase deposited on the surface of the quenched alloy powder particle is eluted and removed. Specifically, quenched alloy powder is impregnated in alkali solution to wash and dry it. The impregnation is performed for 30 minutes to 5 hours while slowly agitating at room temperature. The alkali solution includes sodium hydroxide or potassium hydroxide aqueous solution, and its concentration ranges from 1N to 5N.

The above impregnation condition is exemplified, and the impregnation condition can actually be determined by confirming that only Si-phase deposited on the surface of the particle is eluted and removed. If the impregnation treatment is performed excessively, Si-phase inside of the particle as well as on the surface is eluted and removed to reduce charge and discharge capacities of the negative active material. If Si-phase inside of the particle is eluted and removed, strength of the particle is decreased. If the impregnation condition is insufficient, Si-phase remains on the surface of the particle to induce decomposition reaction of electrolyte.

Specifically, until the specific surface area of the powder after removing Si-phase is 1.2 times larger than that of the quenched alloy powder before removing Si-phase, the impregnation treatment with an alkali solution may be performed. By performing the impregnation treatment until the specific surface area is 1.2 times larger than the initial size, partial or entire Si on the surface can be removed to inhibit a reaction with the electrolyte.

It also is performed until the specific surface area of the powder after removing Si-phase is 50 times smaller than that of the quenched alloy powder before removing Si-phase. Thereby, dissolving Si above necessity is prevented to inhibit reduction of battery capacity.

Through the impregnation treatment, Si-phase deposited on the surface of the quenched alloy powder particle is eluted and removed, and SiM-phase and X-phase or SiX-phase is present on the surface of the particle. Fine pores are formed in positions where Si-phase is removed. By removing Si-phase on the surface of the particle, an amount of Si-phase on the surface of the particle is less than that inside of the particle.

Since the element M and the element X are insoluble in alkali solution and SiM-phase and SiX-phase are difficult to dissolve in an alkali solution, Si-phase is preferentially eluted.

The alloy melt solution including element M, element X, and Si is quenched to easily prepare quenched alloy powder including SiX-phase and SiM-phase, and also either one or both of X-phase and SiX-phase. The obtained quenched alloy powder is impregnated in an alkali solution to remove Si-phase on the surface of the particle, and thereby Si-phase amount on the surface of the particle renders to be smaller than that inside of the particle. Such obtained negative active material inhibits decomposition reaction of the electrolyte and reduces expansion and contraction of the particle itself to improve cycle characteristics.

Thereby, multi-phase alloy powder can be obtained easily which includes SiX-phase and SiM-phase, and also either one or both of X-phase and SiX-phase. Particularly, through gas atomization or water atomization, spherical powders can be obtained. Therefore, filing density and energy density of the negative active material can be improved.

Non-Aqueous Electrolyte

The non-aqueous electrolyte is an organic electrolyte solution including an aprotic solvent and a lithium salt dissolved therein.

The aprotic solvent includes at least one selected from the group consisting of propylene carbonate, ethylene carbonate, butylene carbonate, benzo nitrile, aceto nitrile, tetra hydrofuran, 2-methyl tetrahydrofuran, γ-butyrolactone, dioxolan, 4-methyl dioxolan, N,N-dimethylformamide, dimethyl acetamide, dimethyl sulfoxide, dioxane, 1,2-dimethoxy ethane, sulfolane, dichloro ethane, chloro benzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethyl ether, and combinations thereof. According to one embodiment, the aprotic solvent may essentially includes at least one of propylene carbonate (PC), ethylene carbonate (EC), and butylene carbonate (BC); and at least one selected from the group consisting of dimethyl carbonate (DMC), methylethyl carbonate (MEC), and diethylcarbonate (DEC).

The lithium salt may be selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, where x and y are integers, LiCl, LiI, and combinations thereof. According to one embodiment, $LiPF_6$ may be suitable for the lithium salt.

Alternatively, a polymer electrolyte may also be used. The polymer electrolyte includes a polymer such as PEO, PVA, and so on and the above lithium salt, or includes a polymer having a good swelling property in which an organic electrolyte solution is impregnated instead of the aforementioned non-aqueous electrolyte solution.

Separator

The separator includes a polymer porous film composed of polyolefin resin such as polypropylene, polyethylene, and so on.

A Method for Fabricating a Rechargeable Lithium Battery

Hereinafter, a method of fabricating a rechargeable lithium battery according to one embodiment of the present invention will be described.

The positive electrode is fabricated as follows: a binder such as polyvinylidene fluoride is dissolved in a solvent such as N-methylpyrrolidone, a positive active material and a conductive agent are mixed with the resulting solution to prepare a positive electrode slurry, the positive electrode slurry is coated on a current collector, dried and then cut into an appropriate size.

The negative electrode is fabricated as follows: a binder such as polyvinylidene fluoride is dissolved in a solvent such as N-methylpyrrolidone, a negative active material and a conductive agent as needed are mixed with the resulting solution to prepare a negative electrode slurry, the negative electrode slurry is coated on a current collector, dried and then cut into an appropriate size.

A separator is interposed between the above fabricated positive and negative electrodes to fabricate an electrode assembly. The electrode assembly is housed in a battery case, for example a cylindrical case, and then electrolyte is injected followed by sealing the opening for injecting the electrolyte to fabricate a battery.

When the electrolyte is a solid electrolyte, an electrode assembly is fabricated which includes a positive electrode and a negative electrode, a solid electrolyte and a separator interposed between the positive and negative electrodes as needed, and then the electrode assembly is housed in a battery case such as cylindrical case followed by sealing an opening of the case.

The fabricated battery is first-charged at 0.05 C to 0.2 C charge to a cut-off voltage of 4.1V to 4.3V under a constant current, and then charged for 10 hours to 2.5 hours under a constant voltage. Subsequently, until a discharge capacity is the same as a charge capacity at first charge, the battery is first-discharged at 0.1 C to 0.2 C.

At the first charge, lithiums included in the positive active material are intercalated into a negative active material. At this time, a battery voltage ranges from 4.1V to 4.3V. When the first discharge is performed, most of lithiums intercalated in the negative active material are intercalated into positive active material, but partial lithiums remain in the negative active material. The remaining lithiums incur an irreversible capacity. The battery voltage when lithiums are deintercalated from the negative active material is different depending on combinations of a positive active material and a negative active material, but generally it is about 2.7V. The discharge capacity is less than the charge capacity because of the irreversible capacity.

Therefore, discharge is needed to continuously be performed so that the discharge capacity may be the same as the charge capacity. When the battery voltage is about 1V to about 0V that corresponds to a negative electrode potential of 3.0V to 4.0V verse a metal lithium counter electrode, by the continuous discharge, lithiums start to be deintercalated from a lithium-containing metal compound. Since the lithium-containing metal compound is added so as to compensate an irreversible capacity, lithiums in an amount corresponding to the irreversible capacity are deintercalated from the lithium-containing metal compound until the discharge capacity is the same as the charge capacity When the discharge capacity approaches to the charge capacity, discharging is finished and thereby lithiums in the same amount as that to be transferred to the negative electrode at first charging returns to the positive electrode.

By performing charge and discharge as above, a rechargeable lithium battery can be fabricated, where irreversible capacity of a negative active material is compensated by lithiums included in the lithium-containing metal compound.

When the fabricated rechargeable lithium battery is charged and discharged, a charge cut-off voltage ranges from 4.1V to 4.3V, and a discharge cut-off voltage is 2.7V.

As described above, a rechargeable lithium battery according to one embodiment of the present invention includes a lithium-containing metal compound in a negative electrode, and therefore irreversible capacity at the first charge and discharge may be compensated by lithiums deintercalated from the lithium-containing metal compound at discharge and thereby charge and discharge capacity of the rechargeable lithium battery can be improved. The lithium-containing metal compound is inactive for water and thus it is easy to handle during fabrication of the rechargeable lithium battery.

A potential when lithiums of the lithium-containing metal compound are intercalated and deintercalated ranges from 3.0V to 4.0V with respect to a metal lithium counter electrode, which corresponds to a voltage of 0V to 1V when $LiCoO_2$, $LiNiO_2$, $LiMn_2O_4$, and so on (hereinafter, referred to as $LiCoO_2$ etc.) are used for a positive active material. A battery using $LiCoO_2$ etc. for a positive active material generally has a discharge cut-off voltage of about 2.7V, but is not discharged to about 1V.

A rechargeable lithium battery is discharged to a discharge cut-off voltage of 0V to 1V only at the first discharge to induce lithium deintercalation from the lithium-containing metal compound, and then discharged to a discharge cut-off voltage of 2.7V at a second charge and discharge and thereafter to prevent over-discharge, electrolyte decomposition, or negative current collector dissolution.

In accordance with a method of manufacturing the rechargeable lithium battery, the battery is charged to a predetermined charge cut-off voltage, and then is discharged so that a discharge capacity may be the same as a charge capacity. At discharge, lithiums are deintercalated from a negative active material as well as the lithium-containing metal compound, and lithiums deintercalating from lithium-containing metal compound compensates irreversible capacity occurring at the first charge, resulting in providing a rechargeable lithium battery with high charge and discharge capacity. The charge capacity is the same as the discharge capacity, and thereby excessive lithiums are not intercalated compared the charge capacity of the positive active material and overcharge can be inhibited.

When the negative electrode is a metal lithium counter electrode, the first discharge is performed until the potential is a discharge cut-off voltage, and thereby lithiums are deintercalated from the lithium-containing metal compound at only first discharge, resulting in prevention of overdischarge, and electrolyte decomposition or dissolution of a negative current collector.

The following examples illustrate the present invention in more detail. However, it is understood that the present invention is not limited by these examples.

Example 1

Polyvinylidene fluoride is dissolved in N-methylpyrrolidone to prepare 50% concentration of a solution, and then $LiCoO_2$ and carbon black were added to the solution to prepare a slurry. The slurry was coated on an Al foil, dried and then cut to a suitable size to fabricate a positive electrode. Theoretical charge and discharge capacity of the positive electrode was 140 mAh/g.

Polyvinylidene fluoride is dissolved in N-methylpyrrolidone to prepare 50% concentration of a solution, and then graphite and $Li_3V_2(PO_4)_3$ were added to the solution to prepare a slurry. The slurry was coated on a Cu foil, dried and then cut to a suitable size to fabricate a negative electrode.

$Li_3V_2(PO_4)_3$ was added in an amount of 10 mass % based on the mass of the graphite. Theoretical charge and discharge capacity of the negative electrode was 330 mAh/g, and electrical capacity of $Li_3V_2(PO_4)_3$ is 120 mAh/g.

Between the negative electrode and the positive electrode, a separator of polypropylene was interposed to provide an electrode assembly. Then, it was inserted in a coin-type battery case. For an electrolyte solution, 1.3M $LiPF_6$ was dissolved in a mixed solvent of ethylene carbonate (EC) and dimethyl carbonate (DMC) (volume ratio of EC:DMC=3:7). The electrolyte solution was injected into the battery case and sealed on the opening of the battery case to provide a cell according to Example 1.

Example 2

A cell was fabricated in accordance with the same procedure as in Example 1 except that Li2CuO2 was added instead of Li3V2(PO4)3. The Li2CuO2 was added in an amount of 10 mass % based on the mass of the graphite. Theoretical charge and discharge capacity of the negative electrode was 330 mAh/g, and electrical capacity of $Li_2CuO_2$ is 110 mAh/g. Theoretical charge and discharge capacity of the positive electrode was 140 mAh/g.

Comparative Example 1

A cell was fabricated in accordance with the same procedure as in Example 1 except that $Li_3V_2(PO_4)_3$ was not added. Theoretical charge and discharge capacities of the negative and positive electrodes were 330 mAh/g and 140 mAh/g respectively.

For the first charge, the cells according to Examples 1 and 2 and Comparative Example 1 were charged at 0.2 C to a charge cut-off voltage of 4.2V under a constant current, and then charged for 2.5 hours under a constant voltage.

The cells according to Examples 1 and 2 were discharged at 0.1 C until the discharge capacity was the same as the charge capacity at the first charge. At discharge, a discharge cut-off voltage was about 0V that corresponds to 4.0V when Li is a counter electrode.

For the first discharge, the cell according to Comparative Example 1 was charged at 0.1 C to a voltage of 2.75V.

Next, the cells according to Examples 1 and 2 and Comparative Example 1 were four times charged and discharged. Charging was performed at 0.5 C to a charge cut-off voltage of 4.2V under constant current, and then for 1 hour under a constant voltage. The discharging was performed at 0.5 C to a discharge cut-off voltage of 2.75V.

With respect to the cells, charge and discharge efficiency (the $n^{th}$ discharge capacity/the $n^{th}$ charge capacity×100(%)) at each charge and discharge cycle was calculated. The results are shown in Table 1.

TABLE 1

| | Negative active material | Lithium-containing metal compound | Charge and Discharge efficiency (%) | | | | |
|---|---|---|---|---|---|---|---|
| | | | 1 cycle | 2 cycle | 3 cycle | 4 cycle | 5 cycle |
| Example 1 | graphite | Li$_3$V$_2$(PO$_4$)$_3$ | 100 | 99 | 99.2 | 99.3 | 99.6 |
| Example 2 | graphite | Li$_2$CuO$_2$ | 100 | 98.9 | 99.1 | 99.3 | 99.4 |
| Comparative Example 1 | graphite | — | 91.3 | 98.5 | 99.2 | 99.4 | 99.6 |

As shown in Table 1, the cells according to Examples 1 and 2 show charge and discharge efficiency of 100% at the first cycle, and maintain high charge and discharge efficiency of 99% at the second cycle and thereafter.

On the contrary, the cell according to Comparative Example 1 shows charge and discharge efficiency of 91.3% at the first cycle, which is decreased compared to those of Examples 1 and 2. The reason is that a part of lithium might be caught in a negative active material to incur irreversible capacity. Charge and discharge efficiency of Comparative Example 1 after the second cycle does not seem to show a big difference from those of Examples 1 and 2. However, the first charge and discharge efficiency of Comparative Example 1 decreased by about 10% compared with those of Examples 1 and 2.

According to a rechargeable lithium battery of the present invention, since a negative electrode includes a lithium-containing metal compound that is inactive for water and deintercalates lithium during at the discharge, the lithium can compensate irreversible capacity generated at the first charge and discharge, increasing charge and discharge capacity of the rechargeable lithium battery.

In addition, since the lithium-containing metal compound is inactive with water, it is easy to handle during the manufacturing process.

Furthermore, the lithium-containing metal compound intercalates and deintercalates lithium in a potential ranging from 1.0V to 4.0V when metal lithium is a counter electrode. This potential range may correspond to a battery voltage ranging from 0V to 1V in a battery including LiCoO2, LiNiO2, LiMn2O, and the like (hereinafter, referred to as LiCoO2 and the like) in a positive active material. A battery including LiCoO2 and the like in a positive active material generally has a discharge cut-off voltage at 2.7V and not be discharged up to 1V or so. Accordingly, a rechargeable lithium battery including a lithium-containing metal compound of the present invention is set to have a discharge cut-off voltage at a range of 0V to 1V during the first discharge, so that lithium can be deintercalted from the lithium-containing metal compound. Then, it is set to have a discharge cut-off voltage at 2.7V after the second discharge. In result, the rechargeable lithium battery can be prevented from over-discharge and also, from decomposition of an electrolyte and dissolution of a negative current collector.

On the other hand, according to a method of manufacturing a rechargeable lithium battery of the present invention, a battery is fabricated by adding a lithium-containing metal compound to a negative electrode, then, charged up to a predetermined charge cut-off voltage and discharged to the same capacity as charged. Accordingly, lithium can be deintercalated from lithium-containing metal compound as well as a negative active material and thereby, compensate irreversible capacity generated during the first charge, securing a rechargeable lithium battery with high charge and discharge capacity. In addition, there is no worry of over-intercalation of lithium comparing with charge capacity of a positive active material, preventing overcharge.

Moreover, since a negative electrode has a potential up to the discharge cut-off voltage at the first discharge when metal lithium is a counter electrode, lithium may be intercalated only from a lithium-containing metal compound during the first discharge, preventing over-discharge and also, decomposition of an electrolyte solution and dissolution of a negative current collector.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery, comprising:
a positive electrode comprising a positive active material intercalating and deintercalating lithium;
a negative electrode comprising a negative active material intercalating and deintercalating lithium; and
a non-aqueous electrolyte,
wherein the negative electrode further comprises a lithium-containing metal compound that is inactive for water and deintercalates lithium during at least discharge,
wherein the lithium-containing metal compound is present in an amount corresponding to 5% to 15% of a theoretical capacity of the negative active material to compensate for irreversible capacity of the negative active material,
wherein the lithium-containing metal compound comprises at least one element selected from the group consisting of S, P, O, Cl, Se, F, Br, I and combinations thereof, and wherein the lithium-containing metal compound further comprises Li3T2(PO4)3, wherein T comprises an element selected from the group consisting of Fe, V, and combinations thereof.

2. The rechargeable lithium battery of claim 1, wherein the lithium-containing metal compound has a potential of 1.0 to 4.0V relative to a metal lithium counter electrode during intercalation and deintercalation of lithium.

3. The rechargeable lithium battery of claim 1, wherein the lithium-containing metal compound further comprises an element selected from the group consisting of Ni, Co, Cu, Zn, Ga, Ge, Si, Al, Fe, V, Mn, Ti, Mo, Cr, Nb, Pt, and combinations thereof.

4. The rechargeable lithium battery of claim 1, wherein the lithium-containing metal compound comprises an olivine-based lithium-containing metal compound.

5. The rechargeable lithium battery of claim 1, wherein the lithium-containing metal compound comprises Li$_2$CuO$_2$.

6. The rechargeable lithium battery of claim 1, wherein the negative active material comprises a material selected from the group consisting of C; Si; Sn; Al; a Si alloy; a Sn alloy; a Al alloy; a metallic compound comprising an element selected from the group consisting of C, Si, Sn, Al, and combinations thereof; and combinations thereof.

7. The rechargeable lithium battery of claim 1, wherein the negative active material comprises a multi-phase alloy powder comprising SiX-phase; SiM-phase; and either one or both of X-phase and SiX-phase, where M comprises an element selected from the group consisting of Ni, Co, As, B, Cr, Cu, Fe, Mg, Mn, Y, and combinations thereof, and X comprises an element selected from the group consisting of Ag, Cu, Au, and combinations thereof.

8. A method of manufacturing a rechargeable lithium battery, comprising:
   providing a positive electrode comprising a positive active material, a negative electrode comprising a negative active material and a lithium-containing metal compound that is inactive for water and deintercalates lithium during at least discharge, and a non-aqueous electrolyte;
   providing the non-aqueous electrolyte between the positive and negative electrode to fabricate a rechargeable lithium battery;
   charging the battery to a charge cut-off voltage; and
   discharging the battery until a discharge capacity is the same as a charge capacity,
   wherein the lithium-containing metal compound comprises at least one element selected from the group consisting of S, P, O, Cl, Se, F, Br, I and combinations thereof wherein the lithium-containing metal compound further comprises Li3T2(PO4)3, wherein T comprises an element selected from the group consisting of Fe, V, and combinations thereof, and
   wherein an irreversible capacity of the negative active material is compensated by forming the lithium-containing metal to comprise 5% to 15% of a theoretical capacity of the negative active material.

9. The method of claim 8, wherein the first discharge is performed until a potential of the negative electrode is 1.0 to 4.0V relative to a metal lithium counter electrode.

10. The method of claim 8, wherein the lithium-containing metal compound further comprises at least one element selected from the group consisting of Ni, Co, Cu, Zn, Ga, Ge, Si, Al, Fe, V, Mn, Ti, Mo, Cr, Nb, Pt, and combinations thereof.

11. The method of claim 8, wherein the lithium-containing metal compound comprises an olivine-based lithium-containing metal compound.

12. The method of claim 8, wherein the lithium-containing metal compound comprises $Li_3T_2(PO_4)_3$, wherein T comprises an element selected from the group consisting of Fe, V, and combinations thereof.

13. The method of claim 8, wherein the lithium-containing metal compound comprises $Li_2CuO_2$.

14. A rechargeable lithium battery, comprising:
   a positive electrode comprising a positive active material intercalating and deintercalating lithium;
   a negative electrode comprising a negative active material intercalating and deintercalating lithium; and
   a non-aqueous electrolyte,
   wherein the negative electrode further comprises a lithium-containing metal compound that is inactive for water and deintercalates lithium during at least discharge,
   wherein the lithium-containing metal compound comprises at least one element selected from the group consisting of S, P, O, Cl, Se, F, Br, I and combinations thereof,
   wherein the lithium-containing metal compound is present in an amount corresponding to 5% to 15% of a theoretical capacity of the negative active material to compensate for irreversible capacity of the negative active material, and
   wherein the lithium-containing metal compound further comprises $Li_2CuO_2$.

* * * * *